(12) United States Patent
Bouldin et al.

(10) Patent No.: US 12,275,533 B2
(45) Date of Patent: Apr. 15, 2025

(54) INLET SYSTEM FOR AUXILIARY POWER UNIT

(71) Applicant: HONEYWELL INTERNATIONAL INC., Charlotte, NC (US)

(72) Inventors: Bruce Bouldin, Phoenix, AZ (US); Adam Kowal, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/327,965

(22) Filed: Jun. 2, 2023

(65) Prior Publication Data

US 2024/0400219 A1    Dec. 5, 2024

(51) Int. Cl.
*F02C 7/042* (2006.01)
*B64D 33/02* (2006.01)
*B64D 41/00* (2006.01)

(52) U.S. Cl.
CPC ............. *B64D 33/02* (2013.01); *B64D 41/00* (2013.01); *F02C 7/042* (2013.01); *B64D 2033/0213* (2013.01); *F05D 2220/50* (2013.01)

(58) Field of Classification Search
CPC ........................ B64D 2033/0213; F02C 7/042
See application file for complete search history.

(56) References Cited

U.S. PATENT DOCUMENTS

| | | | |
|---|---|---|---|
| 7,540,142 B2 | 6/2009 | Sheoran et al. | |
| 8,141,816 B2 | 3/2012 | Robbins et al. | |
| 8,403,264 B2 | 3/2013 | Schiek et al. | |
| 9,611,050 B2 | 4/2017 | Tretow et al. | |
| 10,232,951 B2 | 3/2019 | Manoukian et al. | |
| 2002/0131862 A1* | 9/2002 | Sheoran | F15D 1/04 415/208.1 |
| 2003/0080244 A1* | 5/2003 | Dionne | B64D 33/08 244/57 |
| 2003/0132342 A1* | 7/2003 | Koncsek | F02C 7/042 244/53 B |
| 2005/0224635 A1* | 10/2005 | Hein | F02C 7/04 244/10 |
| 2006/0102779 A1 | 5/2006 | Campbell et al. | |
| 2006/0196993 A1* | 9/2006 | Hein | F02C 6/08 244/53 B |

(Continued)

FOREIGN PATENT DOCUMENTS

EP    1257468 B1    12/2004
GB    672917 A    5/1952

*Primary Examiner* — Todd E Manahan
*Assistant Examiner* — Marc Amar
(74) *Attorney, Agent, or Firm* — Lorenz & Kopf LLP

(57) ABSTRACT

An inlet system for an auxiliary power unit includes an inlet duct, and a frame coupled about the inlet duct. The frame defines an opening configured to be in fluid communication with the inlet duct. The inlet system includes a door having a first end opposite a second end. The door is coupled to the frame at the second end. The door is configured to move relative to the frame between a first position in which the door cooperates with the frame to inhibit airflow into the inlet duct and a second position in which the door is configured to enable the airflow into or out of the inlet duct. The door defines a ramp at the second end. A hook is spaced a distance apart from the ramp to define a gap configured to enable the airflow into or out of the inlet duct in the second position.

20 Claims, 10 Drawing Sheets

(56) References Cited

U.S. PATENT DOCUMENTS

| | | | |
|---|---|---|---|
| 2009/0272847 A1* | 11/2009 | Robbins | B64D 41/00 244/129.5 |
| 2011/0001019 A1 | 1/2011 | Bouldin et al. | |
| 2013/0081706 A1* | 4/2013 | Garcia Nevado | B64D 41/00 137/15.1 |
| 2015/0031276 A1* | 1/2015 | Tretow | F02C 7/042 454/151 |
| 2015/0115099 A1* | 4/2015 | Payangapadan | B64C 1/0009 137/15.1 |
| 2018/0106225 A1* | 4/2018 | Dionne | B64D 33/02 |
| 2018/0257788 A1 | 9/2018 | Liu | |
| 2019/0127077 A1* | 5/2019 | Barreiro Rodriguez | B64D 33/02 |

* cited by examiner

INLET SYSTEM FOR AUXILIARY POWER UNIT

TECHNICAL FIELD

The present disclosure generally relates to vehicles, such as aerial vehicles, and more particularly relates to an inlet system for an auxiliary power unit associated with an aerial vehicle.

BACKGROUND

Generally, aerial vehicles, such as aircraft, have an onboard auxiliary power unit to provide electrical power and compressed air to various systems. When the aircraft is on the ground, the auxiliary power unit may be the primary source of power to drive the environmental control systems, air driven hydraulic pumps, and the starters for the engines, for example. During flight, auxiliary power units may also provide pneumatic and electric power. Generally, an intake duct is defined through a skin of the aircraft and is in fluid communication with the auxiliary power unit to provide the auxiliary power unit with air during operation. Typically, the intake duct includes a door, which is selectively opened and closed based on auxiliary power unit and/or aircraft requirements to enable or disable airflow through the intake duct. The door, however, may create high pressure losses and distortion in the airflow through the intake duct when operating on the ground or in flight, which may reduce performance of the auxiliary power unit.

Accordingly, it is desirable to provide an inlet system for an auxiliary power unit, which reduces pressure losses and distortion in airflow to the auxiliary power unit while operating. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is an inlet system for an auxiliary power unit. The inlet system includes an inlet duct, and a frame coupled about the inlet duct. The frame defines an opening configured to be in fluid communication with the inlet duct. The inlet system includes a door having a first end opposite a second end. The door is coupled to the frame at the second end. The door is configured to move relative to the frame between at least a first, closed position in which the door cooperates with the frame to inhibit airflow into the inlet duct and a second, opened position. In the second, opened position, the door is configured to enable the airflow into or out of the inlet duct. The door defines a ramp at the second end. The inlet system includes a hook spaced a distance apart from the ramp to define a gap configured to enable the airflow into or out of the inlet duct in the second, opened position.

The door has a first surface opposite a second surface, and the ramp is defined on the second surface. The second surface of the door encloses the opening in the first, closed position. The gap is defined downstream of the opening at a first frame end of the frame in a direction of the airflow into or out of the inlet duct. The hook is coupled to the frame so as to be proximate the inlet duct. The hook has a first hook end and a second hook end, a first hook surface opposite a second hook surface, the second hook end is opposite the first hook end, the first hook surface is opposite the second hook surface, the second hook surface is coupled to the frame, and the hook tapers from the first hook end to the second hook end along the first hook surface. The gap is continuous from a first side of the door to an opposite, second side of the door. The frame and the inlet duct cooperate to define a first airflow passage, a second airflow passage adjacent to but separate from the first airflow passage and a third airflow passage defined by the gap, and the third airflow passage is in fluid communication with the first airflow passage. The distance varies from a first side of the door to an opposite, second side of the door. The ramp is defined outward of a pivot axis associated with the door at the second end.

Further provided is an auxiliary power unit. The auxiliary power unit includes an inlet duct, and a frame coupled about the inlet duct. The frame defines an opening configured to be in fluid communication with the inlet duct. The auxiliary power unit includes a door having a first end opposite a second end. The door is coupled to the frame at the second end, and the door is configured to pivot about a pivot axis relative to the frame between at least a first, closed position in which the door cooperates with the frame to inhibit airflow into the inlet duct and a second, opened position in which the first end of the door is spaced apart from the frame to enable the airflow into or out of the inlet duct. The door defines a ramp at the second end that extends outwardly about a portion of the pivot axis. The auxiliary power unit includes a hook spaced a distance apart from the ramp to define a gap configured to enable the airflow into or out of the inlet duct in the second, opened position and the gap is continuous between the hook and the ramp.

The door has a first surface opposite a second surface, and the ramp is defined on the second surface. The second surface of the door encloses the opening in the first, closed position. The gap is defined downstream of the opening at a first frame end of the frame in a direction of the airflow into or out of the inlet duct. The hook is coupled to the frame so as to be proximate the inlet duct. The hook has a first hook end and a second hook end, a first hook surface opposite a second hook surface, the second hook end is opposite the first hook end, the first hook surface is opposite the second hook surface, the second hook surface is coupled to the frame, and the hook tapers from the first hook end to the second hook end along the first hook surface. The frame and the inlet duct cooperate to define a first airflow passage, a second airflow passage adjacent to but separate from the first airflow passage and a third airflow passage defined by the gap, and the third airflow passage is in fluid communication with the first airflow passage. The distance varies from a first side of the door to an opposite, second side of the door. The distance decreases from a first hook end to a second hook end of the hook. The distance decreases from a first hook end to a midpoint of a length of the hook, and increases from the midpoint to a second hook end.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
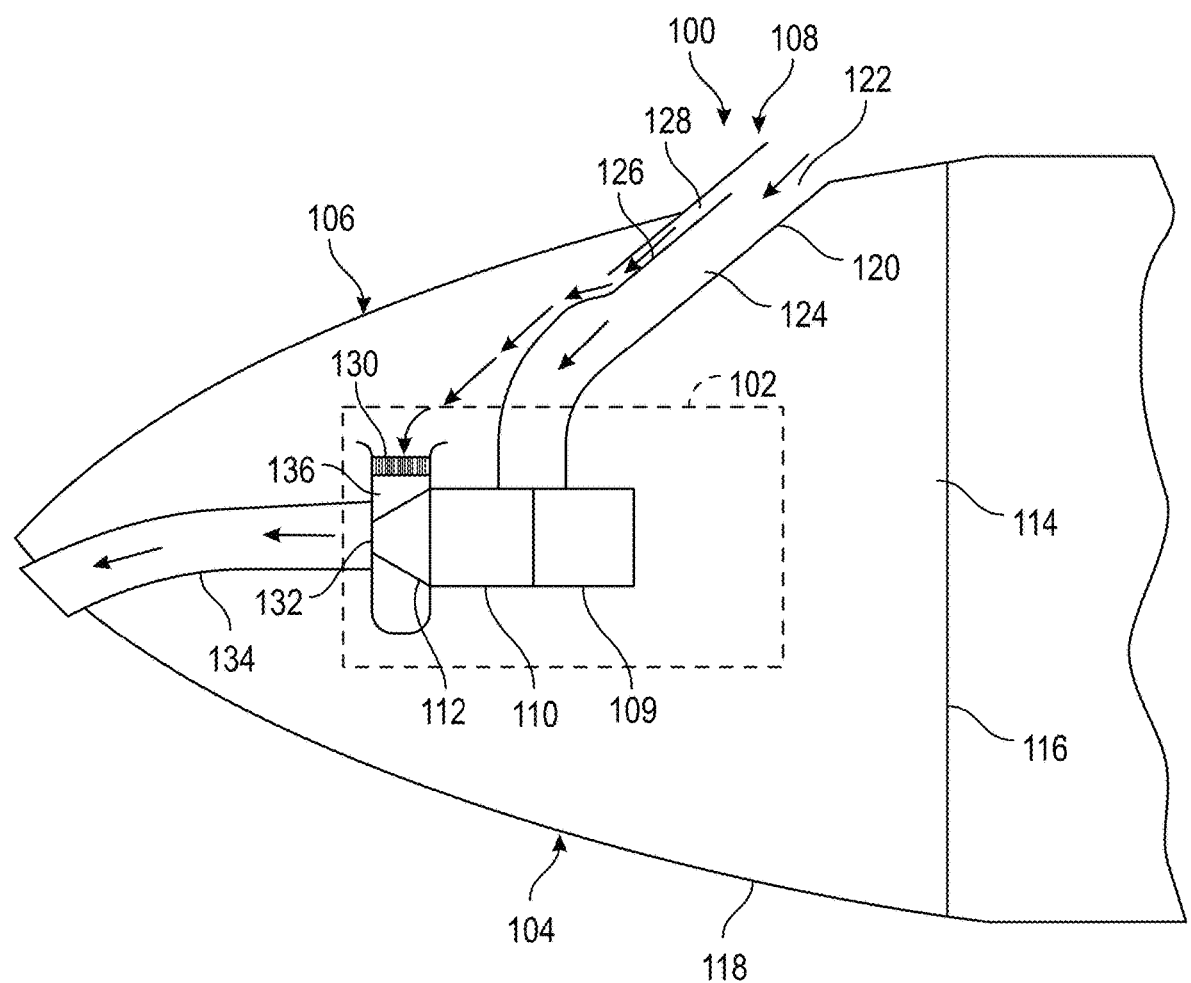
FIG. 1 is a cross-sectional schematic illustration of an inlet system for an auxiliary power unit associated with an aerial vehicle, such as an aircraft, in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of vehicle that would benefit from an inlet system having reduced pressure losses and distortion, and the use of the inlet system for an auxiliary power unit and an aerial vehicle described herein is merely one exemplary embodiment according to the present disclosure. In addition, while the inlet system is described herein as being used with an auxiliary power unit onboard a vehicle, such as a bus, motorcycle, train, automobile, marine vessel, military vehicle, aircraft, rotorcraft, unmanned aircraft, and the like, the various teachings of the present disclosure can be used with an auxiliary power unit on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a cross-sectional schematic illustration of an inlet system 100 for use with an auxiliary power unit 102 is shown. In this example, the inlet system 100 and the auxiliary power unit 102 are mounted in a tailcone 104 of an aerial vehicle, such as an aircraft 106, in accordance with an exemplary embodiment. As will be discussed, the inlet system 100 includes a door assembly 108, which enables reduced pressure losses and distortion in airflow into the inlet system 100 at both ground operating conditions and in-flight operating conditions. The reduced pressure losses and distortion results in improved performance of the auxiliary power unit 102, which may improve a fuel consumption associated with the auxiliary power unit 102.

In one example, the auxiliary power unit 102 includes a compressor 109, a combustor 110, and a turbine 112. Generally, the auxiliary power unit 102 may be positioned in a compartment 114, which is located in the aft fuselage of the aircraft 106. The compartment 114 may be separated from the rest of the fuselage by a firewall 116, and a skin or exterior surfaces 118 of the aircraft 106 form the remaining walls of the compartment 114. In this example, the inlet system 100 includes an inlet duct 120 that extends between an inlet opening 122 in the exterior surface 118 and the auxiliary power unit 102. As will be described in greater detail below, the door assembly 108 is configured to open and close the inlet opening 122 to enable or disable airflow into the inlet duct 120.

Generally, the inlet duct 120 defines a first airflow passage 124 through which the auxiliary power unit 102 draws its combustion air. In this example, the inlet duct 120 further includes a duct divider 126 to define a second airflow passage 128 that extends to an oil cooler 130 associated with the aircraft 106. Thus, the first airflow passage 124 provides combustion air to the auxiliary power unit 102 and the second airflow passage 128 provides cooling air to the oil cooler 130. The first airflow passage 124 is adjacent to, but separate and discrete from the second airflow passage 128. Generally, an eductor 132 is positioned along an exhaust passage 134 from the turbine 112. A duct 136 is positioned between the eductor 132 and the oil cooler 130. The eductor 132 creates a low-pressure region at an exit of an exhaust nozzle associated with the auxiliary power unit 102 that assists the second airflow passage 128 in drawing air across the oil cooler 130. The cooling air is then mixed with the exhaust from the auxiliary power unit 102 and expelled into the ambient environment.

Figure 2:
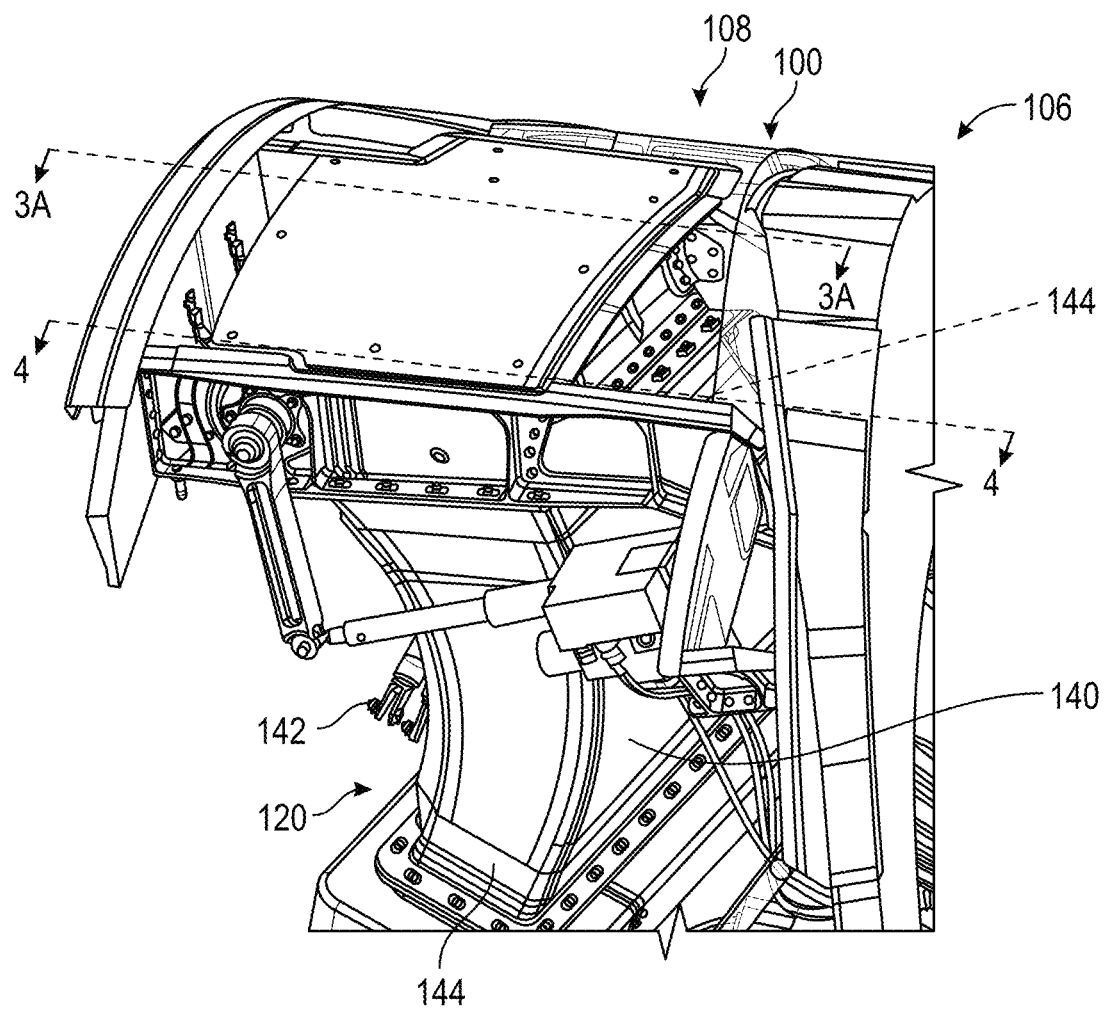
FIG. 2 is a detail perspective view of the inlet system of FIG. 1, in which a door of the inlet system is in a first, closed position in accordance with the various teachings of the present disclosure.
Figure 3:
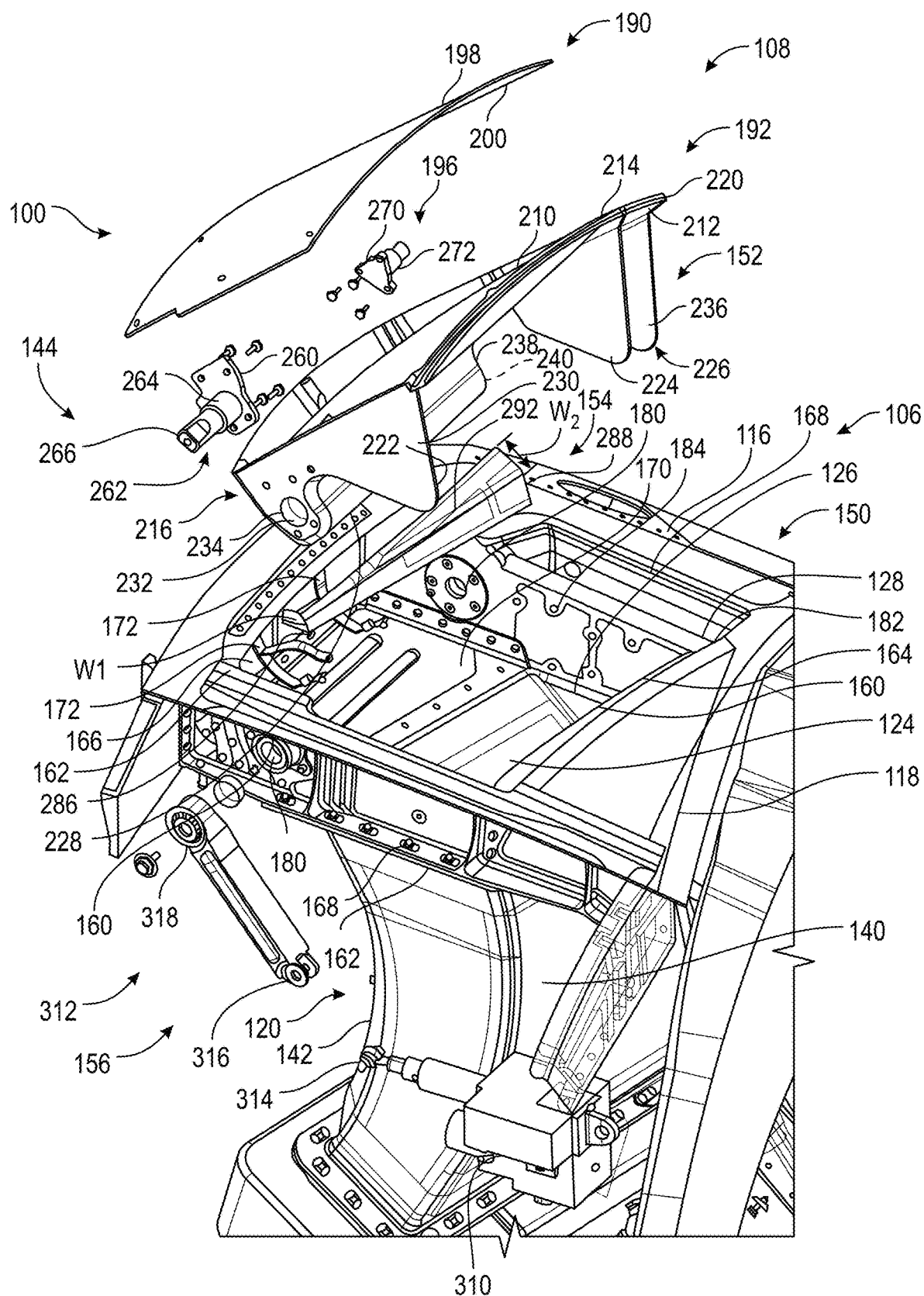
FIG. 3 is an exploded perspective view of the inlet system of FIG. 1.

With reference to FIG. 2, a detailed, perspective view of the inlet system 100 is shown. In one example, the inlet system 100 includes the inlet duct 120 and the door assembly 108. The inlet duct 120 is generally rectangular in cross-section and defined by a first duct wall 140, an opposite second duct wall 142 and a pair of duct sidewalls 144, which interconnect the first duct wall 140 and the second duct wall 142. As shown in FIG. 3, the duct divider 126 divides the inlet duct 120 into the first airflow passage 124 and the second airflow passage 128. The inlet duct 120 is coupled to the door assembly 108 at a first duct end, and is coupled to the compressor 109 of the auxiliary power unit 102 at an opposite second duct end.

The door assembly 108 is coupled to the inlet duct 120. In one example, the door assembly 108 includes a frame 150, a door 152, a hook 154 and an actuator system 156. The frame 150 is coupled to the inlet duct 120. In one example, the frame 150 is substantially rectangular, and has a first frame end 160 opposite a second frame end 162, a first frame wall 164 opposite a second frame wall 166, and a pair of frame sidewalls 168. The frame 150 is composed of metal or metal alloy, including, but not limited to, aluminum, which may be cast, stamped, etc. and assembled together via one or more mechanical fasteners, for example, to define the frame 150. The first frame end 160 is coupled to the exterior surface 118 of the aircraft 106 so as to be disposed around the inlet opening 122 (FIG. 2) beneath the exterior surface 118. The second frame end 162 is coupled to the first duct end of the inlet duct 120. The second frame end 162 may be coupled to the inlet duct 120 via one or more mechanical fasteners, such as bolts. In one example, the second frame end 162 includes a frame panel 170, which interconnects the frame sidewalls 168 along a portion of the second frame end 162. The frame panel 170 is planar and is coupled to the first duct end of the inlet duct 120. The frame panel 170 generally extends along the second frame end 162 from the inlet duct 120 to the second frame end 162. The frame panel 170 cooperates with the frame sidewalls 168 to surround the door 152, and to enable a movement of the door 152 relative to the frame 150.

Figure 4:
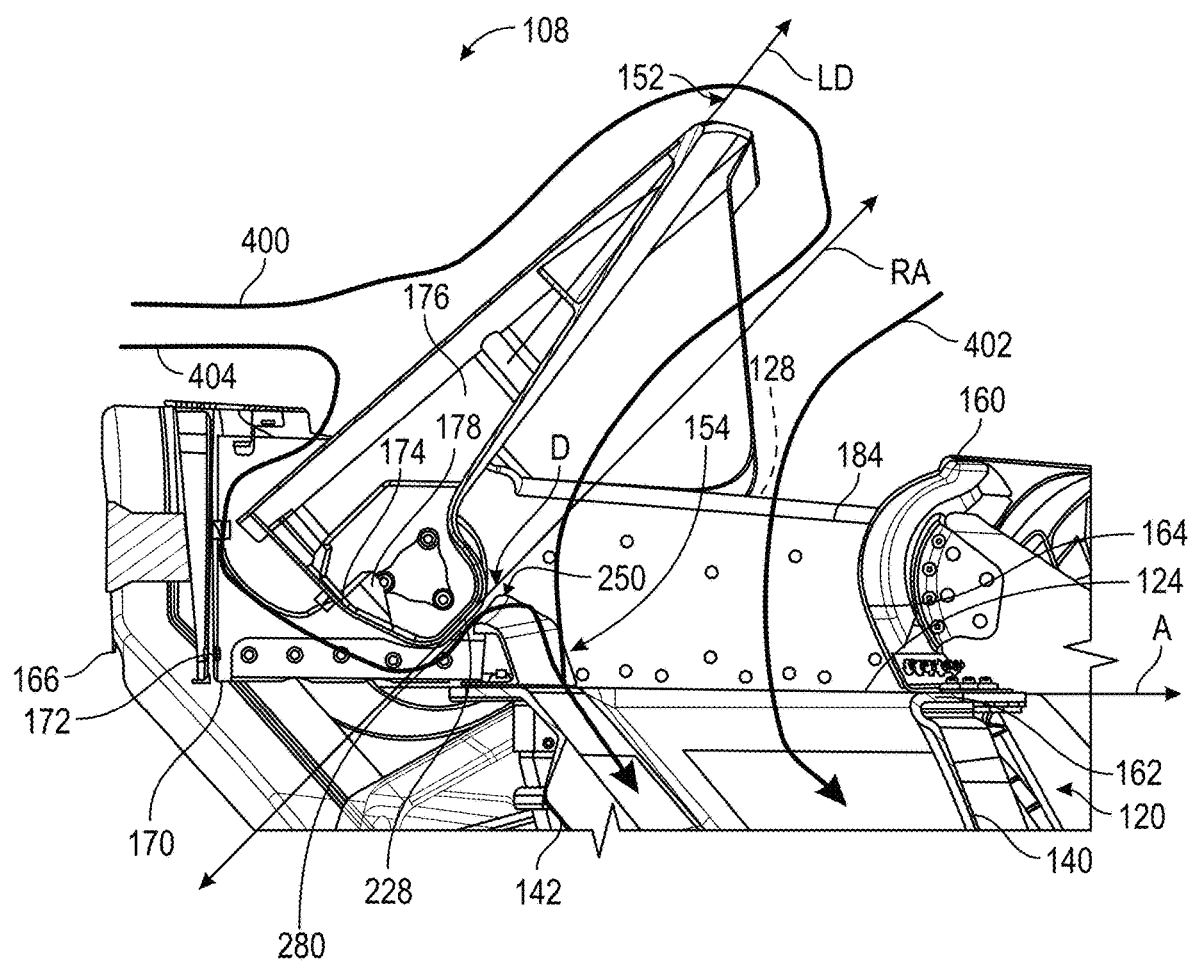
FIG. 4 is a detail cross-sectional view of the inlet system, taken from the perspective of line 4-4 of FIG. 2, in which the door is in the second, opened position, and the aircraft is on the ground or stationary.

With reference to FIG. 4, the first frame wall 164 is curved from the first frame end 160 to the second frame end 162. In this example, the first frame wall 164 includes a concave curvature defined between the first frame end 160 and the second frame end 162, which assists in guiding the flow into the inlet duct 120. The second frame wall 166 is substantially planar and is coupled to the frame sidewalls 168 (FIG. 3) and the frame panel 170. With reference back to FIG. 3, the second frame wall 166 may also include one or more bonding straps 172. The bonding straps 172 are coupled between the second frame wall 166 and the door 152 and accommodate a movement of the door 152. The bonding straps 172 assist in grounding the door 152. The bonding straps 172 may be coupled to the second frame wall 166 via one or more mechanical fasteners, welding, etc. and may be coupled to the door 152 via mechanical fasteners, welding, etc. In one example, with reference back to FIG. 4, an end 174 of each of the bonding straps 172 is positioned within an interior chamber 176 of the door 152 and coupled to a respective interior flange 178 of the door 152 via a mechanical fastener. In other examples, the end 174 may be coupled to a second door end 216 of the door 152.

Figure 3A:
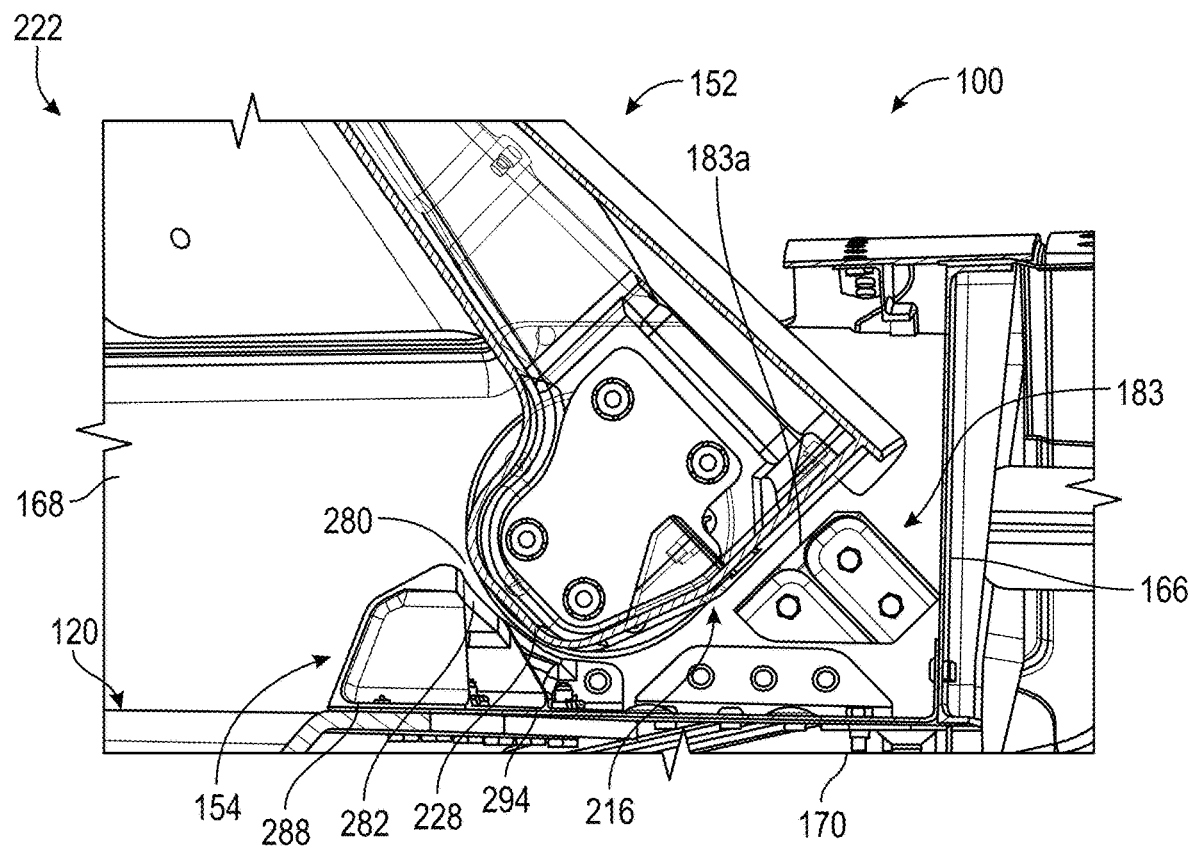
FIG. 3A is a partial cross-sectional view of a portion of the inlet system, taken from line 3A-3A in FIG. 2, in which the door is in a second, opened position.

With reference to FIG. 3, the frame sidewalls 168 interconnect the first frame end 160 and the second frame end 162. The frame sidewalls 168 each define a respective pivot bore 180. The pivot bores 180 are coaxial, and are configured to receive a portion of the door 152 to enable the door 152 to rotate relative to the frame 150. In this example, the pivot bores 180 are defined through the frame sidewalls 168 so as to be proximate the second frame end 162. With reference to FIG. 3A, in one example, at least one of the frame sidewalls 168 includes a door stop 183. The door stop 183 provides a mechanical stop for the continued rotation of the door 152. In the example of FIG. 3A, the bonding straps 172 are removed for clarity. In this example, the door stop 183 is coupled to the frame sidewall 168 at an angle, and defines a surface 183a that may contact the second door end 216 of the door 152 when the door 152 is in the second, opened position. The door stop 183 is coupled to the frame sidewall 168 so as to be proximate one of the pivot bores 180.

With reference to FIG. 3, the frame 150 also defines a frame opening 182 that extends through the first frame end 160 to the second frame end 162 to enable air to flow through the inlet opening 122 into the inlet duct 120. In this example, the frame 150 also includes a frame divider 184, which cooperates with and is aligned with the duct divider 126 to separate the frame opening 182 to direct flow into the first airflow passage 124 and the second airflow passage 128. The frame opening 182 is in fluid communication with the inlet duct 120 via the first airflow passage 124 and the oil cooler 130 via the second airflow passage 128.

In one example, the door 152 includes a first door member 190, a second door member 192, a first door pivot 194, and a second door pivot 196. The door 152 is composed of a metal or a metal alloy, including, but not limited to aluminum; and the first door member 190, the second door member 192, the first door pivot 194, and the second door pivot 196 may be cast, forged, stamped, additively manufactured, etc. The first door member 190 is a door panel, and is coupled to the second door member 192 to enclose a portion of the second door member 192. The first door member 190 has a first panel surface 198 opposite a second panel surface 200. The first panel surface 198 is curved, and is configured to correspond with the exterior surface 118 of the aircraft 106. The second panel surface 200 is coupled to the second door member 192.

Figure 5:
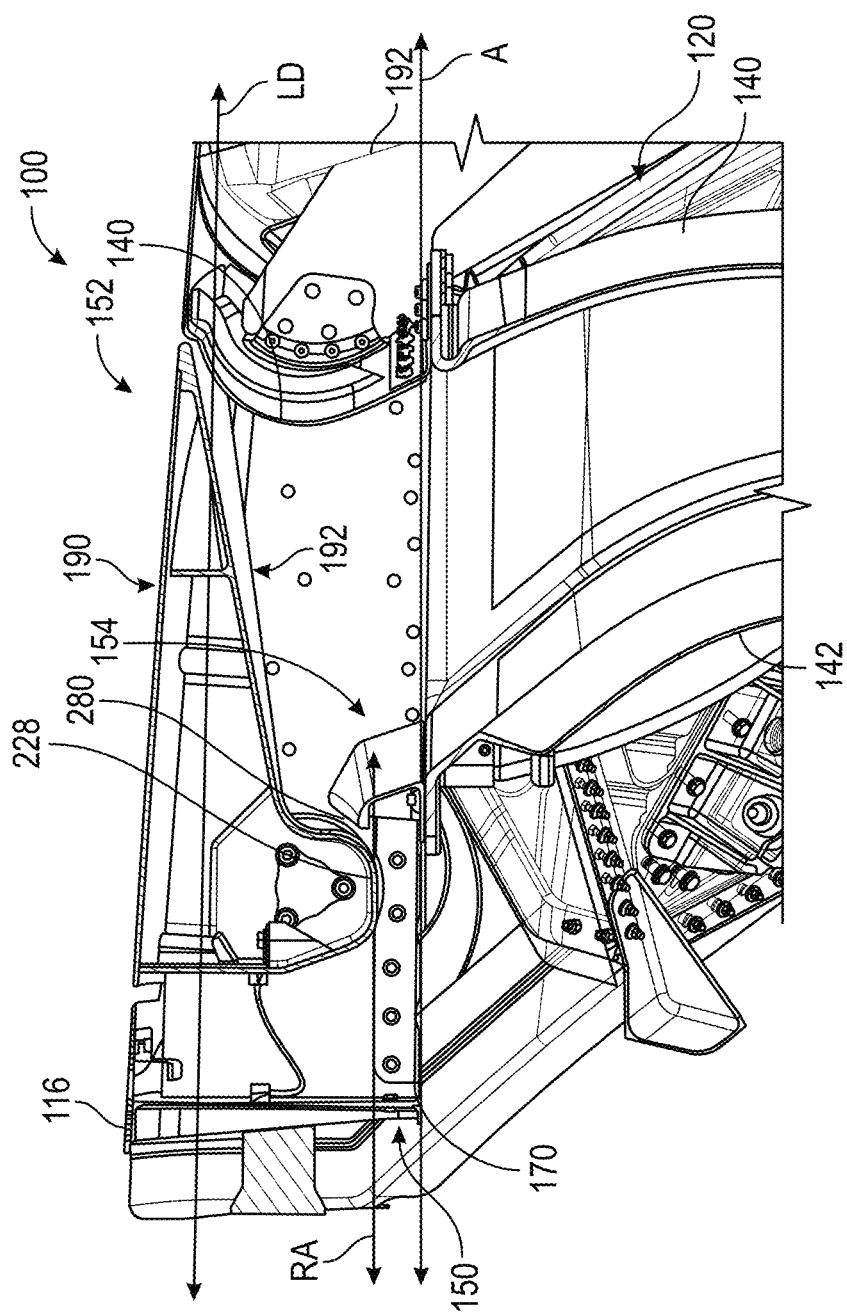
FIG. 5 is a detail cross-sectional view of the inlet system, taken from line 4-4 of FIG. 2, in which the door is in the first, closed position.

The second door member 192 includes a first door surface 210 opposite a second door surface 212, a first door end 214 opposite the second door end 216 and a first door side 218 opposite a second door side 220. The first door end 214 is a forward end or leading end, and the second door end 216 is an aft end or trailing end in a direction of flow into the inlet opening 122. The first door surface 210 is coupled to the first door member 190 to define the interior chamber 176 (FIG. 4). The second door surface 212 includes a first door sidewall 222, a mid-door guide plate 224, a second door sidewall 226 and a ramp surface or ramp 228. The second door surface 212 encloses the frame opening 182 to inhibit the flow of air into the inlet duct 120 when the door 152 is in a first, closed position (FIG. 5). In the first, closed position, the door 152 cooperates with the frame 150 to inhibit airflow into the inlet duct 120. The first door sidewall 222 extends outwardly from the second door surface 212 toward the inlet duct 120. The first door sidewall 222 is coupled to the first door side 218 so as to extend along the first door side 218 from the first door end 214 to the second door end 216. In this example, the first door sidewall 222 includes a first guide plate 230 and a first pivot flange 232.

The first guide plate 230 is spaced apart from the first pivot flange 232 to enable the door 152 to enter the first, closed position without contacting the hook 154. The first guide plate 230 cooperates with the mid-door guide plate 224 to direct the airflow into the first airflow passage 124 when the door 152 is in a second, opened position (FIG. 4). In the second, opened position, the first door end 214 of the door 152 is spaced apart from the frame 150 to enable the airflow into the inlet duct 120. The first guide plate 230 is substantially triangular, and tapers from the first door end 214 toward the second door end 216. The first pivot flange 232 is defined proximate or at the second door end 216. The first pivot flange 232 includes a first door pivot bore 234, which is coaxially aligned with the respective pivot bore 180 when the door 152 is coupled to the frame 150. The first door pivot bore 234 receives a portion of the first door pivot 194, and the first door pivot 194 is coupled to the first door pivot bore 234 via one or more mechanical fasteners, for example.

The mid-door guide plate 224 extends outwardly from the second door surface 212. The mid-door guide plate 224 is substantially triangular, and tapers from the first door end 214 toward the second door end 216. The mid-door guide plate 224 cooperates with the frame divider 184 to direct the incoming airflow into both the first airflow passage 124 and the second airflow passage 128. Stated another way, the mid-door guide plate 224 aerodynamically separates the first airflow passage 124 and the second airflow passage 128. In one example, the mid-door guide plate 224 is coupled to the second door surface 212 so as to be received within the second airflow passage 128 proximate the frame divider 184 when the door 152 is in the first, closed position (FIG. 5). The mid-door guide plate 224 cooperates with the first guide plate 230 to direct air into the first airflow passage 124, and the mid-door guide plate 224 cooperates with a third guide plate 236 to direct air into the second airflow passage 128. It should be noted that in other embodiments, the mid-door guide plate 224 may be coupled to the second door surface 212 so as to be received within the first airflow passage 124 proximate the frame divider 184 when the door 152 is in the first, closed position (FIG. 5).

The second door sidewall 226 is substantially similar to the first door sidewall 222. The second door sidewall 226 extends outwardly from the second door surface 212 toward the inlet duct 120. The second door sidewall 226 is coupled to the second door side 220 so as to extend along the second door side 220 from the first door end 214 to the second door end 216. In this example, the second door sidewall 226 includes the third guide plate 236 and a second pivot flange 238. The third guide plate 236 cooperates with the mid-door guide plate 224 to direct the airflow into the second airflow passage 128 when the door 152 is in the second, opened position (FIG. 4). The third guide plate 236 is substantially triangular, and tapers from the first door end 214 toward the second door end 216. The second pivot flange 238 is defined proximate or at the second door end 216. The second pivot flange 238 includes a second door pivot bore 240, which is coaxially aligned with the respective pivot bore 180 when the door 152 is coupled to the frame 150. The second door pivot bore 240 receives a portion of the second door pivot 196, and the second door pivot 196 is coupled to the second door pivot bore 240 via one or more mechanical fasteners, for example.

The ramp 228 is defined on the second door surface 212 so as to be proximate or at the second door end 216. Generally, the ramp 228 is defined on the second door surface 212 to be proximate the first pivot flange 232 and the second pivot flange 238. The ramp 228 typically extends outward from the second door surface 212 about at least a portion of a pivot axis defined by the first pivot flange 232 and the second pivot flange 238. The ramp 228 extends from the first door side 218 to the second door side 220 along the second door end 216. With reference to FIG. 4, the ramp 228 cooperates with the hook 154 to define a third airflow passage 250, which enables airflow to enter into the inlet duct 120 from the second duct wall 142, which is the aft side of the inlet duct 120. By enabling air to flow into the inlet duct 120 from the aft or second duct wall 142 of the inlet duct 120, void formation near the aft or the second duct wall 142 of the inlet duct 120 is substantially inhibited, which improves performance of the auxiliary power unit 102 (FIG. 1) on the ground. In addition, the airflow through the third airflow passage 250 during flight acts to stabilize flow into the inlet duct 120. Generally, the ramp 228 is shaped with smooth curvatures to avoid sharp corners to provide airflow with reduced pressure losses and separation into the inlet duct 120 during flight of the aircraft 106. In one example, the ramp 228 is defined on the second door end 216 to extend along a ramp axis RA, which is substantially parallel to a longitudinal axis LD of the door 152. The ramp axis RA is substantially oblique to an axis A that extends through the frame panel 170 when the door 152 is in the second, opened position (FIG. 4). The ramp axis RA is substantially parallel to the axis A when the door 152 is in the first, closed position, as shown in FIG. 5.

With reference to FIG. 3, the first door pivot 194 is coupled to the first pivot flange 232 at the first door side 218. The first door pivot 194 includes a first flange 260 and a pivot pin link 262. The first flange 260 includes one or more bores that each receive a mechanical fastener, such as a screw, bolt, etc. to couple the first flange 260 to the first pivot flange 232. The pivot pin link 262 extends outwardly from the first flange 260. In one example, the pivot pin link 262 includes a pivot pin portion 264 and a link portion 266. The pivot pin portion 264 is received within the first door pivot bore 234 and the respective pivot bore 180 to enable the door 152 to pivot relative to the frame 150. The link portion 266 extends axially from the pivot pin portion 264. The link portion 266 is coupled to the actuator system 156, and is driven by the actuator system 156 to move or rotate the door 152 between the first, closed position (FIG. 5) and the second, opened position (FIG. 4). It should be noted that other techniques may be used to move the door 152, and moreover, that the second door pivot 196 may comprise the link portion 266, if desired.

The second door pivot 196 includes a second flange 270 and a pivot pin 272. The second flange 270 includes one or more bores that each receive a mechanical fastener, such as a screw, bolt, etc. to couple the second flange 270 to the second pivot flange 238. The pivot pin 272 extends outwardly from the second flange 270. The pivot pin 272 is received within the second door pivot bore 240 and the respective pivot bore 180 to enable the door 152 to pivot relative to the frame 150. The interior flanges 178 for the bonding straps 172 are defined at the second door end 216 so as to be spaced apart from the first door pivot 194 and the second door pivot 196.

Figure 6:
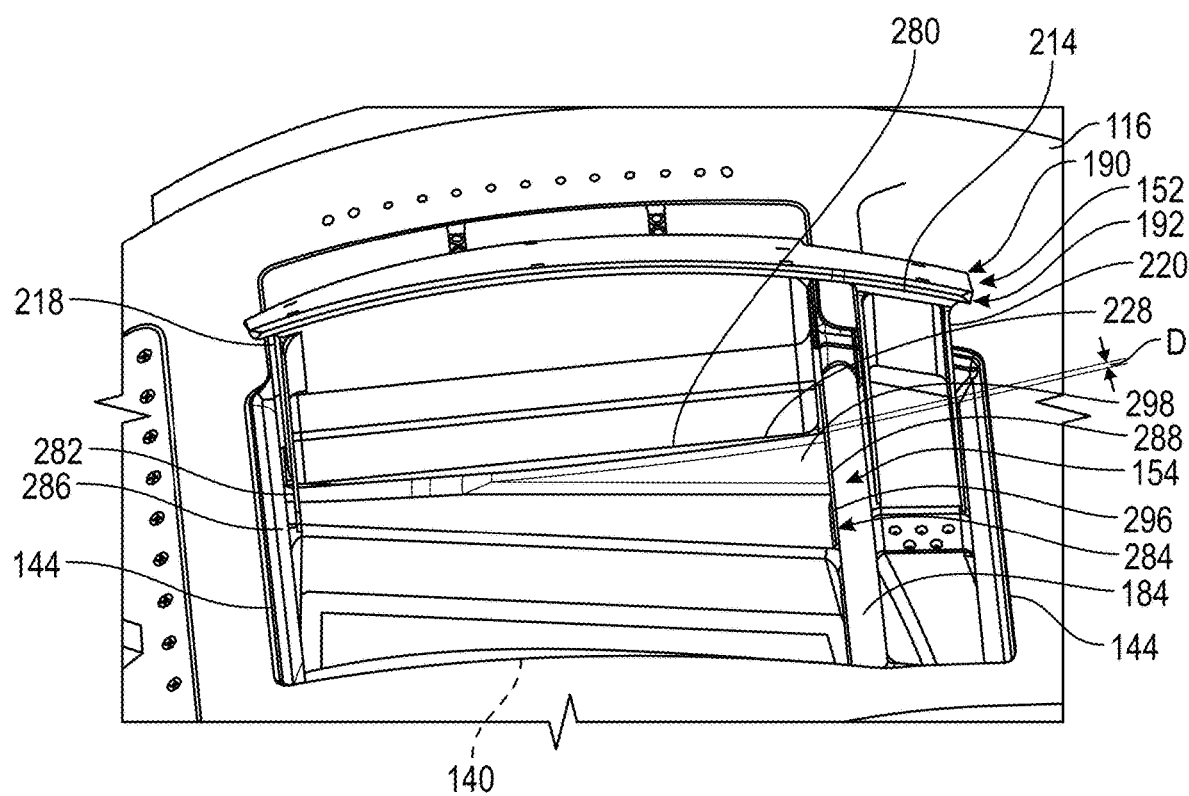
FIG. 6 is a forward view of the inlet system of FIG. 1, in which the door is in the second, opened position.
Figure 6A:
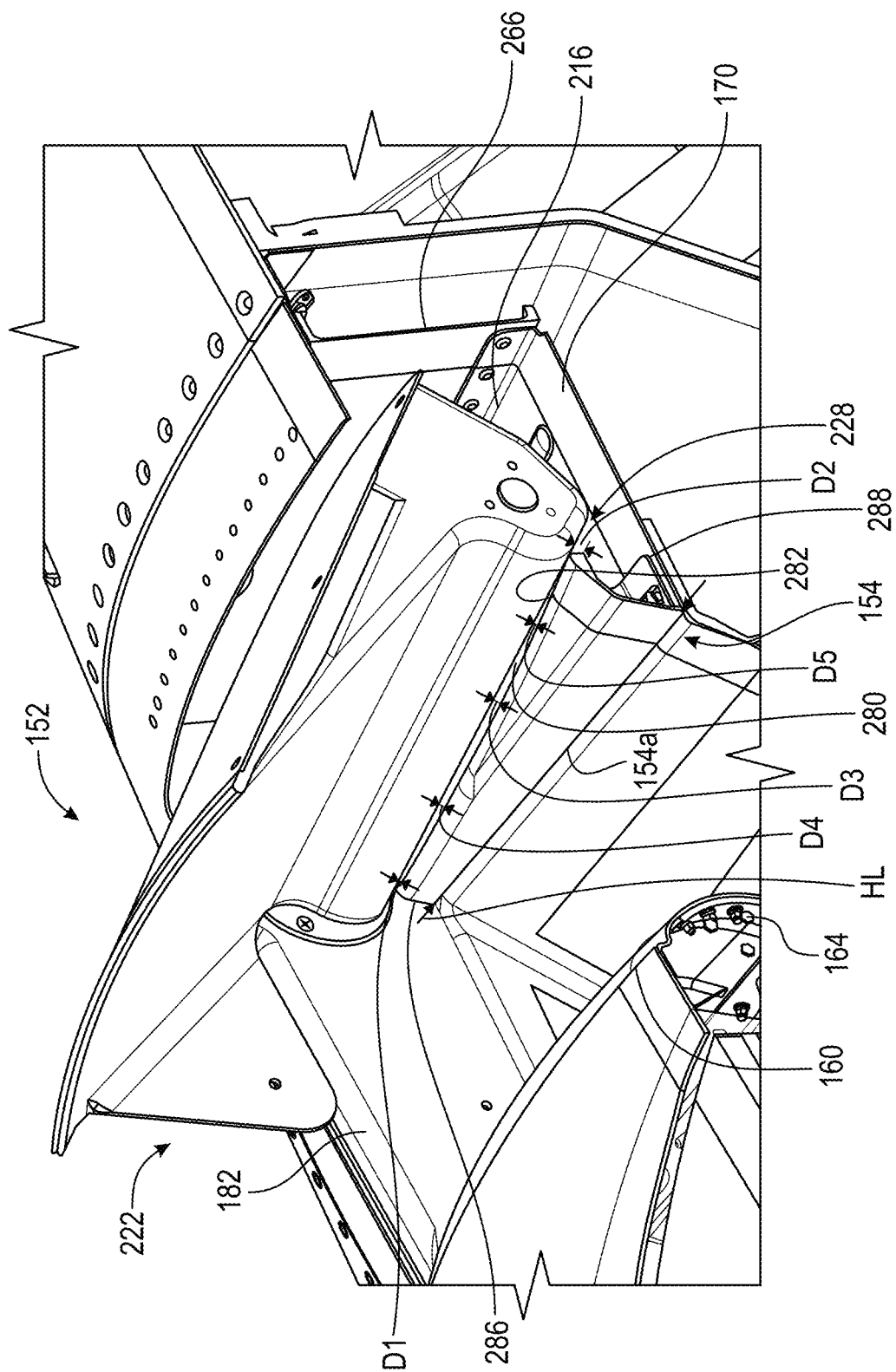
FIG. 6A is a perspective partially cross-sectional view of the inlet system of FIG. 1, taken from the perspective of line 3A-3A in FIG. 2.

With reference to FIG. 2, the hook 154 cooperates with the ramp 228 to define the third airflow passage 250. The hook 154 is composed of a metal or a metal alloy, and may be cast, forged, stamped, additively manufactured, etc. With reference to FIGS. 4 and 6, the hook 154 is coupled to the frame panel 170 so as to be spaced a distance D apart from the ramp 228 and to be proximate to the inlet duct 120. In one example, the distance D is about 0.10 inches (in.) to about 0.38 inches (in.) over a length HL of the hook 154. Stated another way, with reference to FIG. 6A, the hook 154 is coupled to the frame panel 170 such that a gap 280 is defined between the ramp 228 and a second hook side 282 of the hook 154. The gap 280 is downstream of the frame opening 182 at the first frame end 160. The gap 280 is continuous from the first door side 218 to the second door side 220. In one example, the gap 280 is substantially non-uniform or varies between the first door side 218 and the second door side 220, such that the distance D between the hook 154 and the ramp 228 varies between the first door side 218 and the second door side 220.

For example, a distance D1 defined between a second hook side 282 and the ramp 228 at the first hook end 286 is about 0.30 inches (in.) to about 0.38 inches (in.). A distance D2 defined between the second hook end 288 and the ramp 228 is about 0.21 inches (in.) to about 0.29 inches (in.). A distance D3 at a midpoint 154a of the length HL or at about 50% of the length HL of the hook 154 defined from a first hook end 286 to the second hook end 288 is about 0.15 inches (in.) to about 0.23 inches (in.). A distance D4, defined at about 25% of the length HL of the hook 154 proximate the first hook end 286 is about 0.10 inches (in.) to about 0.18 inches (in.). A distance D5, defined at about 75% of the length HL of the hook 154 proximate the second hook end 288 is about 0.19 inches (in.) to about 0.27 inches (in.). Thus, in this example, the distance D between the hook 154 and the ramp 228 decreases from the first hook end 286 to the second hook end 288 as the distance D1 is different and greater than the distance D2. In addition, the distance D decreases from the first hook end 286 to the midpoint 154a of the length HL of the hook 154 and increases from the midpoint 154a of the length HL of the hook 154 to the second hook end 288 as the distance D1 is different and greater than the distance D3, and the distance D3 is different and less than the distance D2. A local minimum distance is the distance D4, which is defined at about 25% of the length HL proximate the first hook end 286. A local maximum distance is defined at the first hook end 286.

Generally, the distance D varies within a range that provides for ease of manufacture of the hook 154 without substantially adversely impacting the aerodynamics of the airflow through the third airflow passage 250. It should be noted that the distances D1-D5 may be varied to restrict or increase the airflow as needed through the third airflow passage 250 for the particular configuration of the door 152 and the hook 154. Further, it should be noted that in other examples, the distance D may be substantially the same between the hook 154 and the ramp 228 between the first hook end 286 and the second hook end 288 such that the gap 280 is uniform.

In this example, the hook 154 includes a first hook side 284 opposite the second hook side 282. The hook 154 also includes the first hook end 286 opposite the second hook end 288. Generally, with reference to FIGS. 6 and 7, the hook 154 has substantially a C-shape, with a first, top surface 292 opposite a second, bottom surface 294. The first hook side 284 is proximate or adjacent to the second duct wall 142 of the inlet duct 120. The first hook side 284 includes a first guide portion 296 and a second ramp surface 298. The first guide portion 296 extends along an axis AH substantially oblique to the axis A of the frame panel 170 and is shaped to smoothly transition to the second duct wall 142. In one example, the first guide portion 296 is defined at an angle α1 relative to the second, bottom surface 294. In one example, the angle α1 is about 69 degrees. The first guide portion 296 assists in directing the airflow into the first airflow passage 124. The second ramp surface 298 extends from the first guide portion 296 and curves to define the first, top surface 292. The second ramp surface 298 extends along an axis AR3 at the second hook end 288. The axis AR3 is transverse to the axis AH and the axis A. In one example, the second ramp surface 298 extends at an angle α2. The angle α2 is defined between a reference line RL that is parallel to the second, bottom surface 294 and the axis AR3. In this example, the angle α2 is about 29 degrees.

Figure 7:
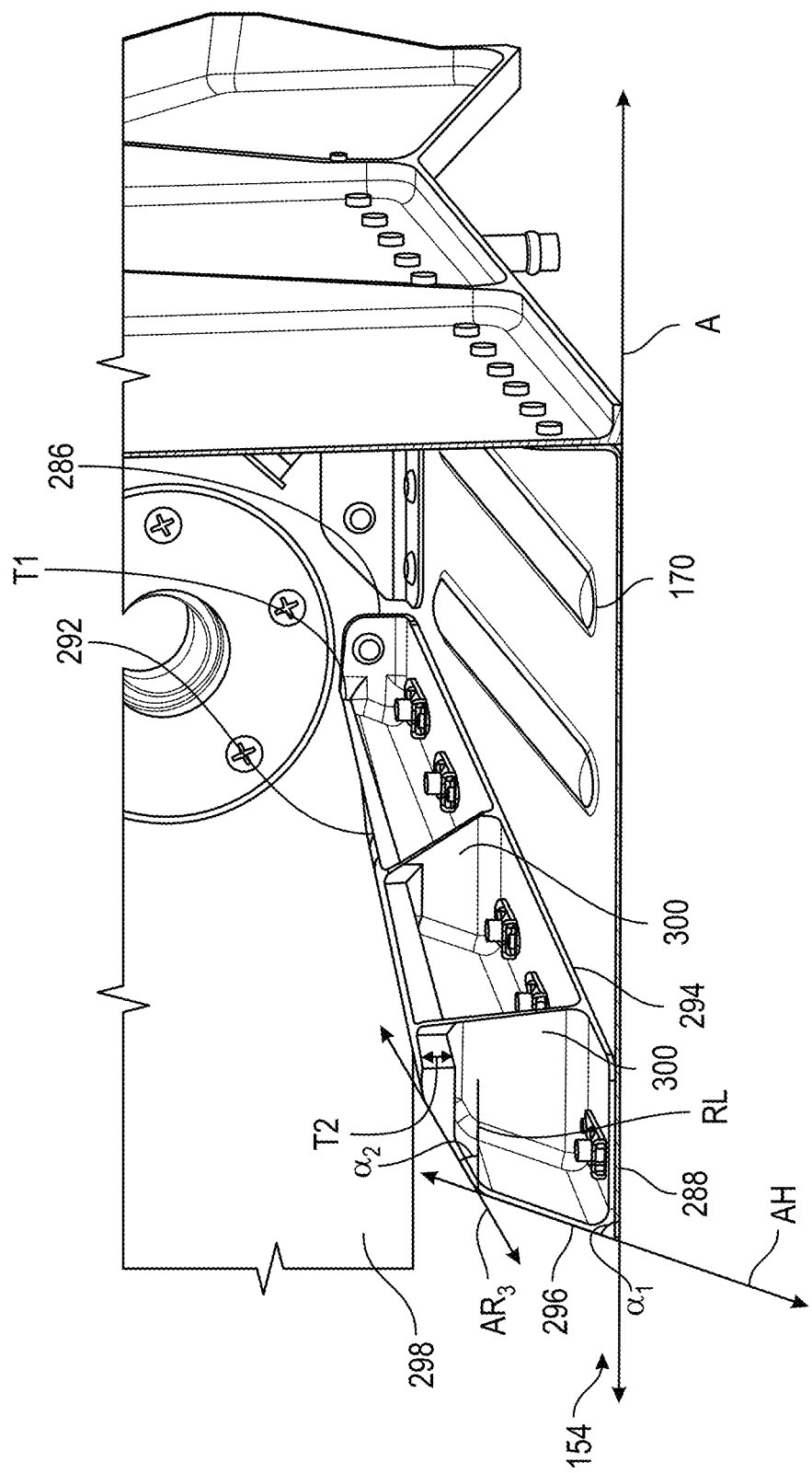
FIG. 7 is an aft view of a hook associated with the inlet system of FIG. 1, in which the door has been removed for clarity.

With reference to FIG. 6, the second ramp surface 298 is substantially triangular, and is defined to extend from the second hook end 288 toward the first hook end 286. In this example, the hook 154 tapers along the first, top surface 292 from the second hook end 288 to the first hook end 286 to maintain the gap 280 with the distance D between the first door side 218 and the first hook end 286, and between the second door side 220 and the second hook end 288. Stated another way, with reference to FIG. 3, the first hook end 286 has a width W1 at the first, top surface 292, which is different and less than a width W2 of the second hook end 288 at the first, top surface 292. With reference to FIG. 7, the first, top surface 292 has a thickness T1 at the first hook end 286, which is different and less than a thickness T2 of the first, top surface 292 at the second hook end 288. The increasing thickness of the first, top surface 292 from the first hook end 286 to the second hook end 288 assists in directing the airflow from the third airflow passage 250 into the inlet duct 120. Stated another way, the first, top surface 292 has a slope, which is defined so as to be spaced apart from the first hook end 286 and to extend to the second hook end 288. The second, bottom surface 294 is substantially planar, and is coupled to the frame panel 170. In this example, the second, bottom surface 294 defines a plurality of bores, which receive a respective mechanical fastener to couple the hook 154 to the frame panel 170. It should be noted that the hook 154 may also be coupled to the inlet duct 120, if desired.

With reference to FIG. 6, the second hook side 282 is proximate or adjacent to the ramp 228 or the second door surface 212, and is spaced apart from the ramp 228 to define the gap 280. With reference to FIGS. 6 and 7, the second hook side 282 may include one or more supports 300 (FIG. 7), which interconnect the first hook side 284 with the first, top surface 292 and assist in directing the flow over the hook 154 and into the inlet duct 120. The first hook end 286 is proximate the first door sidewall 222 of the door 152 when the door 152 is in the first, closed position. The second hook end 288 is proximate the frame divider 184.

With reference back to FIG. 3, the actuator system 156 is responsive to one or more control signals from a controller associated with the auxiliary power unit 102 (FIG. 1) or a controller associated with the aircraft 106 to move the door 152 based on the auxiliary power unit 102 requirements and/or aircraft 106 requirements. The actuator 310 is in communication with the controller via a suitable communication medium, such as a bus. In one example, the actuator system 156 includes an actuator 310 and an actuator link 312. The actuator 310 is responsive to the control signals from the controller to extend or retract a shaft 314. In one example, the actuator 310 is a linear actuator, and the controller includes at least one processor and a memory that stores instructions to control the movement of the actuator 310. The shaft 314 is coupled to the actuator link 312 via one or more pins, for example. The actuator link 312 is rigid and includes a first link end 316 opposite a second link end 318. The first link end 316 is coupled to the shaft 314, and the second link end 318 is coupled to the link portion 266 of the first door pivot 194. Generally, a movement of the shaft 314 results in a corresponding movement of the actuator link 312, which in turn, results in a movement of the door 152 between the first, closed position and the second, opened position.

In one example, with reference to FIG. 3, in order to assemble the inlet system 100, with the inlet duct 120 and the frame 150 assembled, the frame 150 is coupled to the first duct end of the inlet duct 120. The hook 154 is coupled to the frame panel 170 of the frame 150. The second door member 192 is positioned within the frame 150. The first door pivot 194 is coupled to the first pivot flange 232, and the second door pivot 196 is coupled to the second pivot flange 238. The first door member 190 is coupled to the second door member 192 to form the door 152. The inlet duct 120, with the door 152 coupled to the frame 150, is coupled to the auxiliary power unit 102 and positioned such that the first door member 190 is substantially flush with the exterior surfaces 118 of the aircraft 106. With the first link end 316 coupled to the shaft 314 and the actuator 310 coupled to the auxiliary power unit 102, the link portion 266 of the first door pivot 194 is coupled to the second link end 318 of the actuator link 312. The actuator 310 is placed in communication with the controller associated with the auxiliary power unit 102 or one of the controllers associated with the aircraft 106.

Based on the requirements associated with the aircraft 106 and/or the auxiliary power unit 102, one or more signals are communicated to the actuator 310 to move the door 152 from the first, closed position (FIG. 5) to the second, opened position (FIG. 4). In one example, based on the receipt of the one or more control signals, the actuator 310 retracts the shaft 314, which retracts the actuator link 312 and causes the door 152 to pivot about a pivot axis defined by the first pivot portion 268 of the first door pivot 194 and the pivot pin 272 of the second door pivot 196. In the second, opened position, the door 152 is spaced apart from the inlet duct 120 and the inlet opening 122 to enable air to enter into the first airflow passage 124, the second airflow passage 128 and the third airflow passage 250.

On the ground, when the aircraft 106 is stationary, air enters into the inlet duct 120 in the second, opened position under the influence of the auxiliary power unit 102 itself. With reference to FIG. 4, in one example, air enters the first airflow passage 124 aft of the door 152, in the direction generally indicated by arrow 400, and flows over the door 152 and into the first airflow passage 124 and/or the second airflow passage 128. Air also enters into the first airflow passage 124 and/or the second airflow passage 128 forward of the door 152, in the direction generally indicated by the arrow 402. Air also enters aft of the door 152 and flows into the third airflow passage 250, in the direction generally indicated by arrow 404. The air flows through the third airflow passage 250 defined by the gap 280 between the ramp 228 and the hook 154. The air exits the third airflow passage 250 into the inlet duct 120. The air received from the third airflow passage 250 substantially eliminates void formation proximate the second duct wall 142, which reduces pressure losses and distortion in the airflow into the inlet duct 120 and also improves an efficiency of the auxiliary power unit 102.

Figure 8:
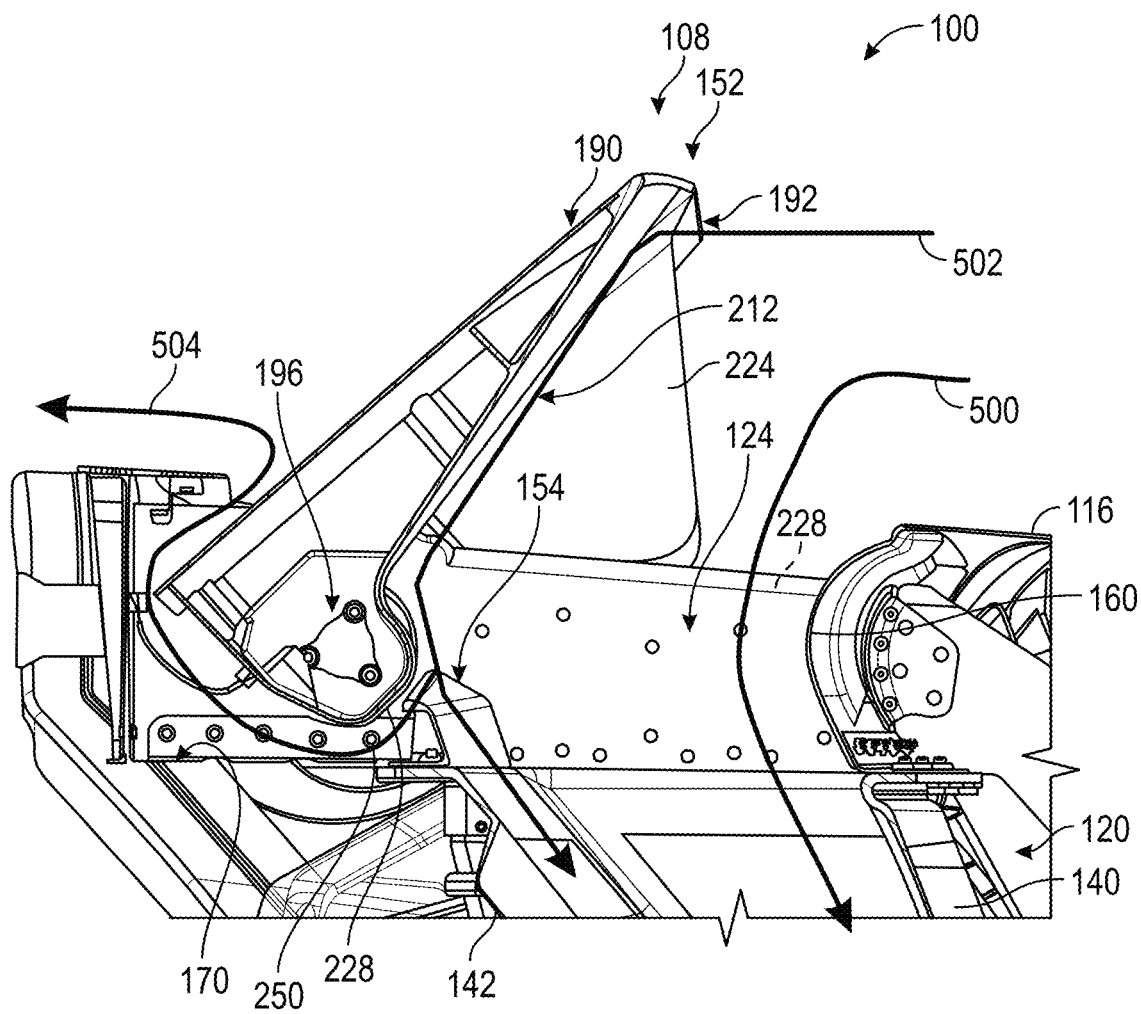
FIG. 8 is a detail cross-sectional view of the inlet system, taken from the perspective of line 4-4 of FIG. 2, in which the door is in the second, opened position, and the aircraft is in flight or moving.

In flight, air enters into the inlet duct 120 under the influence of the airstream associated with the forward motion of the aircraft 106 and the influence of the auxiliary power unit 102. In one example, with reference to FIG. 8, air enters the first airflow passage 124 from forward of the door 152, proximate the exterior surface 118 of the aircraft 106, in the direction generally indicated by arrow 500, and flows into the first airflow passage 124 and/or the second airflow passage 128. Air also enters into the first airflow passage 124 and/or the second airflow passage 128 forward of the door 152, in the direction generally indicated by the arrow 502, and flows along a portion of the second door surface 212. A portion of the air that flows along the second door surface 212 enters into the third airflow passage 250, in the direction generally indicated by arrow 504. The air flows through the third airflow passage 250 defined by the gap 280 between the ramp 228 and the hook 154. The air exits into the ambient environment aft of the door 152. The air received through the third airflow passage 250 in flight acts to stabilize the flow into the inlet duct 120. It should be noted that while the door 152 is shown in the same position (the second, opened position) both on the ground and in-flight, in other embodiments, the door 152 may have a different opened position on the ground and in flight.

Thus, the inlet system 100 improves an efficiency of the auxiliary power unit 102 (FIG. 1) by providing the auxiliary power unit 102 with airflow having reduced pressure losses and distortion. By improving an efficiency of the auxiliary power unit 102 (FIG. 1), a fuel consumption of the auxiliary power unit 102 may be reduced. Generally, the gap 280 defined between the hook 154 and the ramp 228 enables air to flow into or out of the inlet system 100 when the door 152 is in the second, opened position. As discussed, by enabling the leakage of airflow out of the inlet system 100 in flight, the airflow into the inlet duct 120 is stabilized. By enabling the airflow into the inlet system 100 aft of the door 152 while on the ground, the void proximate the second duct wall 142 is reduced, which improves the performance and fuel consumption of the auxiliary power unit 102 when operating on the ground. It should be noted that the shape of the hook 154 is merely exemplary, as the shape of the hook 154 may be modified to correspond to the shape of the ramp 228 of the door 152 to define the gap 280 based on a particular aircraft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet system for an auxiliary power unit, comprising:
    an inlet duct having a forward wall and a most aft wall;
    a frame coupled about the inlet duct, the frame defining an opening configured to be in fluid communication with an ambient environment and the inlet duct;
    a door having a first end opposite a second end, the door coupled to the frame at the second end, the door configured to move relative to the frame between at least a first, closed position in which the door cooperates with the frame to inhibit airflow into the inlet duct and a second, opened position, in the second, opened position the door is configured to enable the airflow into or out of the inlet duct, the door defining a ramp at the second end;
    a hook extending from the most aft wall and coupled to the frame proximate the inlet duct and proximate the second end of the door, the hook located at least partially forward of the second end and spaced a distance apart from the ramp to define a first gap;
    a second gap defined by the frame and the second end, the second gap aft of the second end, the first and second gaps to enable the airflow into or out of the inlet duct in the second, opened position, the enabled airflow including at least an airflow into the auxiliary power unit from the ambient environment and through the second gap at the second end.

2. The inlet system of claim 1, wherein the door has a first surface opposite a second surface, and the ramp is defined on the second surface.

3. The inlet system of claim 2, wherein the second surface of the door encloses the opening in the first, closed position.

4. The inlet system of claim 2, wherein the gap is defined downstream of the opening at a first frame end of the frame in a direction of the airflow into or out of the inlet duct.

5. The inlet system of claim 1, wherein the hook is coupled to the frame so as to be proximate the inlet duct.

6. The inlet system of claim 1, wherein the hook has a first hook end and a second hook end, a first hook surface opposite a second hook surface, the second hook end is opposite the first hook end, the first hook surface is opposite the second hook surface, the second hook surface is coupled to the frame, and the hook tapers from the first hook end to the second hook end along the first hook surface.

7. The inlet system of claim 1, wherein the gap is continuous from a first side of the door to an opposite, second side of the door.

8. The inlet system of claim 1, wherein the frame and the inlet duct cooperate to define a first airflow passage, a second airflow passage adjacent to but separate from the first airflow passage and a third airflow passage defined by the gap, and the third airflow passage is in fluid communication with the first airflow passage.

9. The inlet system of claim 1, wherein the distance varies from a first side of the door to an opposite, second side of the door.

10. The inlet system of claim 1, wherein the ramp is defined outward of a pivot axis associated with the door at the second end.

11. An auxiliary power unit, comprising:
    an inlet duct having a forward wall and a most aft wall;
    a frame coupled about the inlet duct, the frame defining an opening configured to be in fluid communication with an ambient environment and the inlet duct;
    a door having a first end opposite a second end, the door coupled to the frame at the second end, the door configured to pivot about a pivot axis relative to the frame between at least a first, closed position in which the door cooperates with the frame to inhibit airflow into the inlet duct and a second, opened position in which the first end of the door is spaced apart from the frame to enable the airflow into or out of the inlet duct, the door defining a ramp at the second end that extends outwardly about a portion of the pivot axis; and
    a hook extending from the most aft wall and coupled to the frame proximate the inlet duct and proximate the second end of the door, the hook located at least partially forward of the second end and spaced a distance apart from the ramp to define a first gap and the first gap is continuous between the hook and the ramp;
    a second gap defined by the frame and the second end, the second gap aft of the second end, the first and second gaps configured to enable the airflow into or out of the inlet duct in the second, opened position, the enabled airflow including at least an airflow into the auxiliary power unit from the ambient environment and through the second gap at the second end.

12. The auxiliary power unit of claim 11, wherein the door has a first surface opposite a second surface, and the ramp is defined on the second surface.

13. The auxiliary power unit of claim 12, wherein the second surface of the door encloses the opening in the first, closed position.

14. The auxiliary power unit of claim 12, wherein the gap is defined downstream of the opening at a first frame end of the frame in a direction of the airflow into or out of the inlet duct.

15. The auxiliary power unit of claim 11, wherein the hook is coupled to the frame so as to be proximate the inlet duct.

16. The auxiliary power unit of claim 11, wherein the hook has a first hook end and a second hook end, a first hook surface opposite a second hook surface, the second hook end is opposite the first hook end, the first hook surface is opposite the second hook surface, the second hook surface is coupled to the frame, and the hook tapers from the first hook end to the second hook end along the first hook surface.

17. The auxiliary power unit of claim 11, wherein the frame and the inlet duct cooperate to define a first airflow passage, a second airflow passage adjacent to but separate from the first airflow passage and a third airflow passage defined by the gap, and the third airflow passage is in fluid communication with the first airflow passage.

18. The auxiliary power unit of claim 11, wherein the distance varies from a first side of the door to an opposite, second side of the door.

19. The auxiliary power unit of claim 18, wherein the distance decreases from a first hook end to a second hook end of the hook.

20. The auxiliary power unit of claim 18, wherein the distance decreases from a first hook end to a midpoint of a length of the hook, and increases from the midpoint to a second hook end.

* * * * *